A. JOFFRION.
AUTOMOBILE SIGNAL.
APPLICATION FILED NOV. 9, 1918.
1,305,369.
Patented June 3, 1919.
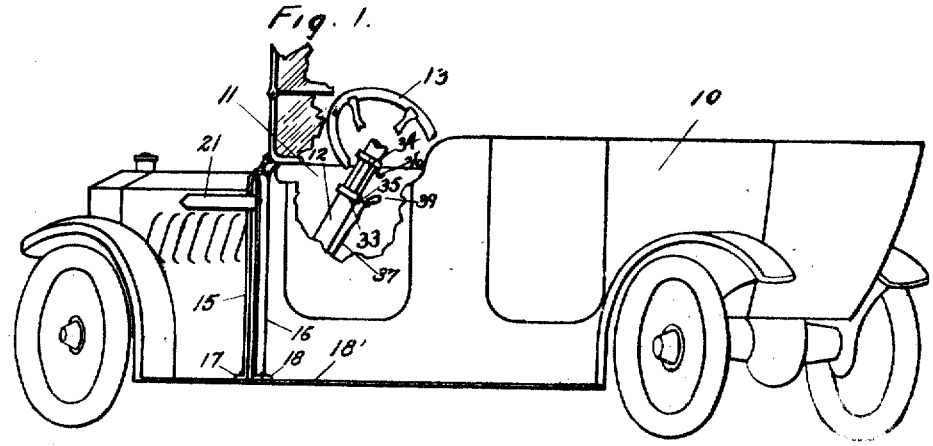
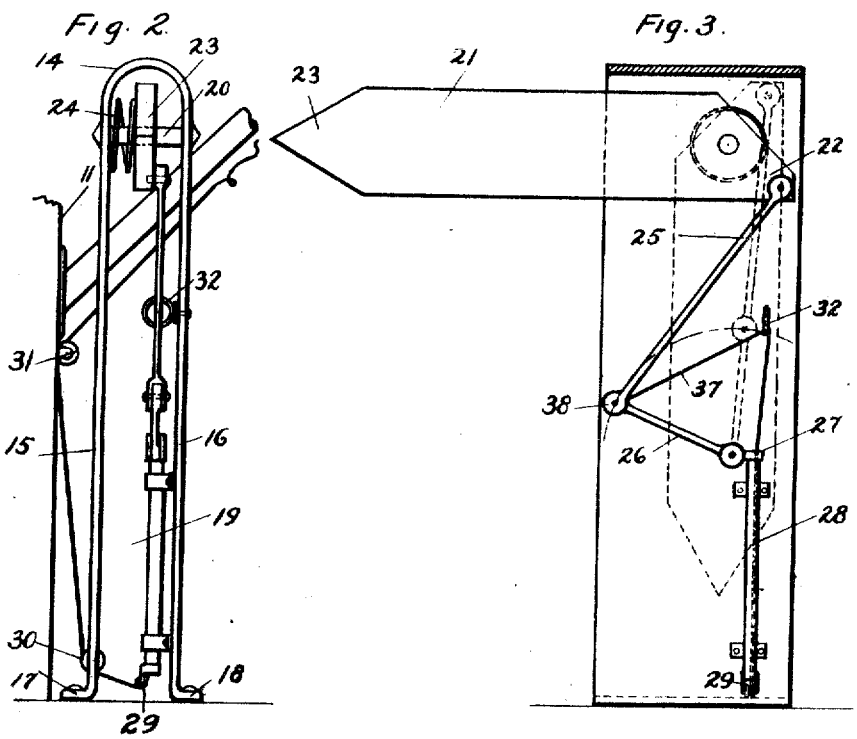
INVENTOR.
BY Abraham Joffrion
Hagans & Miller
ATTORNEY.

UNITED STATES PATENT OFFICE.

ABRAHAM JOFFRION, OF LOS ANGELES, CALIFORNIA.

AUTOMOBILE-SIGNAL.

1,305,369.

Specification of Letters Patent.

Patented June 3, 1919.

Application filed November 9, 1918. Serial No. 261,866.

*To all whom it may concern:*

Be it known that I, ABRAHAM JOFFRION, a citizen of the United States, residing at Los Angeles, in the county of Los Angeles and State of California, have invented new and useful Improvements in Automobile-Signals, of which the following is a specification.

My invention relates to an automobile signal for indicating the side to which a turn is to be made.

The object of my invention is to provide a simple, convenient and inexpensive turning signal adapted for attachment to any form of automobile.

With this and other objects in view my invention consists in the construction, combination and arrangement of parts hereinafter described and claimed.

In the accompanying drawings which form a part of this specification,

Figure 1 is a diagrammatic view in perspective of an automobile equipped with a signaling device embodying the principles of my invention.

Fig. 2 is an enlarged view in side elevation of the signaling device shown in Fig. 1.

Fig. 3 is a rear view in elevation of the signaling device shown in Fig. 2, parts being broken away to disclose the construction.

As indicated by the reference numerals, 10 is an automobile having a dash 11 and a steering column 12 equipped with a steering wheel 13. The general arrangement of these parts may be in accordance with any of the automobiles now in use.

The signal proper consists of a standard, preferably formed of band iron bent to form a curved upper end 14, and two parallel vertical legs 15 and 16 terminating in right angled lugs or flanges 17 and 18 adapted to fasten the standard to the running board 18'. The bend 14 is made wide enough to allow a convenient space 19 between the two legs 15 and 16 of the standard. Near the upper end of the standard thus formed is a transverse pivot shaft 20 having its ends fixed in legs 15 and 16. A signal arm 21 is mounted on this shaft in such a way that the pivot shaft extends through one end of the arm leaving the other end free to swing vertically about it through a quarter of a circle. An extension 22 is formed on the signal arm which serves as a crank arm, as will presently appear. The outer end of the signal arm is tapered to a point 23. A coil spring 24 surrounding the pivot shaft 20 is fixed between the signal arm 21 and standard leg 15, one of its ends being attached to the standard leg and the other end to the signal arm. The spring has a winding tension which operates to hold the arm in a horizontal position as illustrated in the drawings.

A connecting rod 25 having its upper end pivotally attached to extension 22 of the signal arm has its lower end pivotally connected to the upper end of a link 26, the lower end of this link is pivotally attached to a lug 27 formed on the upper end of a tubular guideway 28 which is fixed to the inner side of leg 16 of the standard. The lower end of this tubular guideway is provided with a small pulley 29. A second pulley 30 is pivoted in the opposite standard leg 15 in line with pulley 29. A third pulley 31 is mounted on the dash some distance above pulley 30 and a ring 32 is fixed to the inner side of the standard leg 16 slightly above the tubular guideway 28. A pair of rings or collars 33 and 34 are clamped around the steering column 12. The lower collar 33 is equipped with an apertured lug 35, and the upper collar 34 with a hook 36. A cord 37, having one end attached to the toggle joint 38 formed by the connecting rod 25 and the link 26, is passed through the ring 32 downwardly through the tubular guideway 28 under pulleys 29 and 30 through pulley 31 and finally through the aperture in lug 35. A ring 39 is attached to the end of the cord, so that it stops against the upper side of lug 35.

Operation: The operated position of the signal is shown in the drawings. That is, when the cord 37 is in its released position the spring 24 operates to throw the arm outwardly into a horizontal position. The signal is brought into its concealed position by grasping the ring 39 pulling the cord upwardly until the ring engages with the retaining hook 36. The pull on the cord over pulleys 31, 30 and 29, and through guideway 28 and ring 32 acting on the toggle joint 38, pulls the connecting rod 25 and the link 26 into longitudinal alinement with each other, thus forcing the extension arm 22 of the signal arm 21 upwardly and turning the signal arm about the pivot shaft 20 until it assumes a vertical position within the standard between legs 15 and 16, as indicated by the dotted lines in Fig. 3. As is evident the signal arm is lifted by simply releasing ring 39 from hook 36, whereupon spring 24 operates to bring it to its horizontal position.

While I have shown the preferred construction of my automobile signal, as now known to me, it will be understood that various changes in construction and arrangement of parts may be made by those skilled in the art without departing from the spirit of my invention as claimed.

I claim:

1. A signaling device comprising a standard, a signal arm having one end pivotally attached to said standard, a coil spring having one end attached to said standard and the other to said signal arm adapted to yieldably hold said signal arm in a horizontal position, a connecting rod pivotally attached at its upper end to said signal arm, a link having one end pivotally attached to the lower end of said connecting rod and the other pivotally attached to said standard, the pivoted ends of said connecting rod and said link forming a toggle joint, and means for actuating and holding said toggle joint against the action of said spring whereby said signal arm is brought to an exposed horizontal position or a concealed vertical position within said standard.

2. A signaling device comprising a standard, a signal arm having one end pivotally attached to said standard, a connecting rod pivotally attached at its upper end to said signal arm, a link having one end pivotally attached to the lower end of said connecting rod and the other pivotally attached to said standard, the pivoted ends of said connecting rod and said link forming a toggle joint, a cord attached to the toggle joint and running over guides and adapted to pull the toggle joint straight to swing the signal arm into the standard, and yielding means for swinging the signal arm to a horizontal position.

In testimony whereof I have signed my name to this specification.

ABRAHAM JOFFRION